(12) United States Patent
Wang et al.

(10) Patent No.: US 9,521,262 B2
(45) Date of Patent: Dec. 13, 2016

(54) METHOD AND APPARATUS FOR CALLING TERMINAL TO JOIN CONFERENCE

(71) Applicant: Huawei Technologies Co., Ltd., Shenzhen (CN)

(72) Inventors: Dongqi Wang, Shenzhen (CN); Zhihui Liu, Shenzhen (CN); Ningbo Qiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 228 days.

(21) Appl. No.: 14/450,371

(22) Filed: Aug. 4, 2014

(65) Prior Publication Data

US 2014/0362739 A1 Dec. 11, 2014

Related U.S. Application Data

(63) Continuation of application No. PCT/CN2012/080532, filed on Aug. 24, 2012.

(30) Foreign Application Priority Data

Feb. 28, 2012 (CN) .......................... 2012 1 0047800

(51) Int. Cl.
*H04L 5/14* (2006.01)
*H04M 3/56* (2006.01)
(Continued)

(52) U.S. Cl.
CPC .......... *H04M 3/567* (2013.01); *H04L 12/1818* (2013.01); *H04L 65/403* (2013.01)

(58) Field of Classification Search
CPC ..................... H04M 3/567; H04M 2203/2016; H04L 65/403; H04L 12/1818
(Continued)

(56) References Cited

U.S. PATENT DOCUMENTS

2004/0014457 A1* 1/2004 Stevens .................. G06Q 20/04
455/414.1
2004/0193683 A1 9/2004 Blumofe
(Continued)

FOREIGN PATENT DOCUMENTS

CN 1533135 A 9/2004
CN 1538728 A 10/2004
(Continued)

OTHER PUBLICATIONS

Partial English Translation and Abstract of Chinese Patent Application No. CN102215238A, Aug. 28, 2014, 10 pages.
(Continued)

*Primary Examiner* — Sai-Ming Chan
(74) *Attorney, Agent, or Firm* — Conley Rose, P.C.

(57) ABSTRACT

A method and an apparatus for calling a terminal to join a conference, related to the field of communications technologies, resolving a problem that a process in which a calling terminal calls a called terminal to join the conference or a called terminal requests joining the conference is complicated. The method includes the following steps: receiving first call request information, where the first call request information carries identification information of the called terminal; and calling the called terminal according to the identification information of the called terminal, so that the called terminal receives a message which is published by another terminal in a current conference and that the called terminal publishes a message to another terminal in the current conference. The method may be applied to calling a terminal to join a conference.

20 Claims, 10 Drawing Sheets

(51) Int. Cl.
*H04L 12/18* (2006.01)
*H04L 29/06* (2006.01)

(58) Field of Classification Search
USPC .......................................................... 370/311
See application file for complete search history.

(56) References Cited

U.S. PATENT DOCUMENTS

| | | | | |
|---|---|---|---|---|
| 2005/0059413 | A1* | 3/2005 | Nose | H04L 12/58 455/456.1 |
| 2010/0098230 | A1* | 4/2010 | Bhow | H04L 12/1818 379/202.01 |
| 2011/0219117 | A1* | 9/2011 | Linder | G06Q 10/10 709/224 |

FOREIGN PATENT DOCUMENTS

| | | |
|---|---|---|
| CN | 2667810 Y | 12/2004 |
| CN | 101159788 A | 4/2008 |
| CN | 101969513 A | 2/2011 |
| CN | 102137364 A | 7/2011 |
| CN | 102215238 A | 10/2011 |
| CN | 102624535 A | 8/2012 |

OTHER PUBLICATIONS

Partial English Translation and Abstract of Chinese Patent Application No. CN101159788A, Aug. 28, 2014, 4 pages.
Partial English Translation and Abstract of Chinese Patent Application No. CN102624535A, Aug. 28, 2014, 4 pages.
Partial English Translation and Abstract of Chinese Patent Application No. CN1533135A, Oct. 15, 2014, 8 pages.
Partial English Translation and Abstract of Chinese Patent Application No. CN1538728A, Oct. 15, 2014, 10 pages.
Partial English Translation and Abstract of Chinese Patent Application No. CN2667810, Oct. 15, 2014, 22 pages.
Partial English Translation and Abstract of Chinese Patent Application No. CN101969513A, Oct. 15, 2014, 7 pages.
Foreign Communication From a Counterpart Application, Chinese Application No. 201210047800.X, Chinese Office Action dated Mar. 5, 2014, 9 pages.
Foreign Communication From a Counterpart Application, PCT Application No. PCT/CN2012/080532, English Translation of International Search Report dated Nov. 22, 2012, 2 pages.
Foreign Communication From a Counterpart Application, PCT Application No. PCT/CN2012/080532, English Translation of Written Opinion dated Nov. 22, 2012, 13 pages.

\* cited by examiner

METHOD AND APPARATUS FOR CALLING TERMINAL TO JOIN CONFERENCE

CROSS-REFERENCE TO RELATED APPLICATION

This application is a continuation of International Application No. PCT/CN2012/080532, filed on Aug. 24, 2012, which claims priority to Chinese Patent Application No. 201210047800.X, filed on Feb. 28, 2012, both of which are hereby incorporated by reference in their entireties.

TECHNICAL FIELD

The present invention relates to the field of communications technologies, and in particular, to a method and an apparatus for calling a terminal to join a conference.

BACKGROUND

More and more enterprises use video conferences to perform remote communication. In a video conference, there are various manners for calling a participant to join a conference.

In the prior art, steps for a participant A to call a participant B to join a conference may include: 1. The participant A sends a call request to a conference administrator, where the call request includes a mobile phone number and an Internet Protocol (IP) address of the participant B, information of a site bound with the participant B, and the like; 2. The conference administrator logs in to a conference system, and verifies whether the site that is sent by the participant A and where the participant B is located can be successfully added to the conference, that is, whether the participant A can successfully communicate with the participant B by means of the site bound with the participant B, for example, if the participant B is not in the site, or if the number of participants in the site reaches a maximum value, resulting that the participant B cannot enter the site, or if communication quality of the site is poor and effective communication cannot be performed, the site cannot be added to the conference; 3. If the site where the participant B is located can be successfully added to the conference, the conference administrator sends a call instruction to a conference management system, to instruct the conference management system to call the site bound with the participant B, where the call instruction carries the information of the site bound with the participant B, the mobile phone number and the IP address of the participant B, and the like; and 4. The site calls the participant B according to the call instruction, and the participant B is added to the conference.

In the foregoing process of implementation of calling a terminal to join a conference, the inventor finds that the prior art has at least the following problem: the participant A needs to notify the conference administrator of the mobile phone number and the IP address of the participant B, the information of the site bound with the participant B, and the like, and then, the conference administrator performs corresponding operations to implement that the participant B joins the conference, and therefore, the process of calling the terminal to join the conference is complicated.

SUMMARY

Embodiments of the present invention provide a method and an apparatus for calling a terminal to join a conference, so as to resolve the problem that a process in which a calling terminal calls a called terminal to join the conference or a called terminal requests joining the conference is complicated.

To achieve the foregoing objective, the embodiments of the present invention use the following technical solutions:

A method for calling a terminal to join a conference includes: receiving first call request information, where the first call request information carries identification information of a called terminal; and calling the called terminal according to the identification information of the called terminal, so that the called terminal receives a message which is published by another terminal in a current conference and that the called terminal publishes a message to another terminal in the current conference.

An apparatus for calling a terminal to join a conference includes: a first receiving unit, configured to receive first call request information, where the first call request information carries identification information of a called terminal; and a first call unit, configured to call the called terminal according to the identification information of the called terminal that is received by the first receiving unit, so that the called terminal receives a message which is published by another terminal in a current conference and that the called terminal publishes a message to another terminal in the current conference.

According to the method and apparatus for calling a terminal to join a conference that are provided by the embodiments of the present invention, after the foregoing solutions are used, there is no need to call the called terminal to join the conference using a conference server after examination of an administrator succeeds; and the called terminal can be called after the conference server is directly logged in to and corresponding communication information of the called terminal is provided for the conference server, which lowers complexity of a process of calling the called terminal, and simplifies a conference call process.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part of the embodiments of the present invention rather than all of the embodiments. All other embodiments obtained by a person of ordinary skill in the art based on the embodiments of the present invention without creative efforts shall fall within the protection scope of the present invention.

Figure 1:
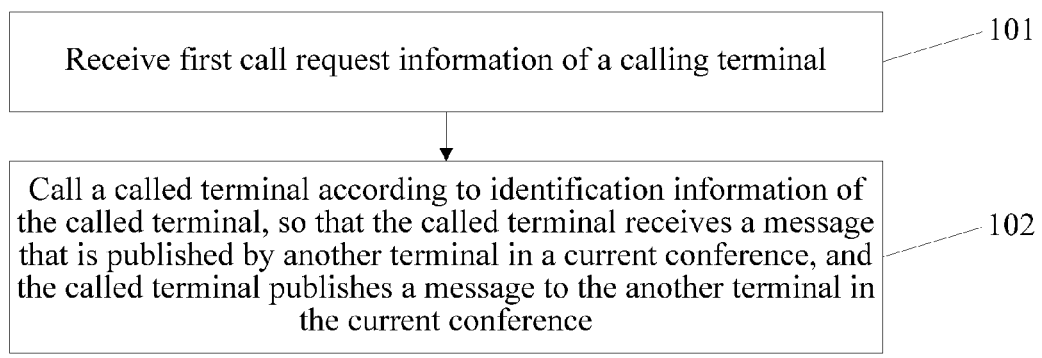
FIG. 1 is a flowchart of a method for calling a terminal to join a conference provided by an embodiment of the present invention.

This embodiment provides a method for calling a terminal to join a conference. As shown in FIG. 1, the method includes the following steps:

101: Receive first call request information.

The first call request information may be sent by a calling terminal, and may also be sent by a called terminal.

The first call request information carries identification information of the called terminal.

If the calling terminal calls the called terminal to join the conference, the first call request information is sent by the calling terminal; and if the called terminal requests joining the conference, the first call request information is sent by the called terminal, in which case, the identification information of the called terminal that is included in the first call request information is identification information of the called terminal that sends the first call request information.

Before the calling terminal calls the called terminal, the calling terminal first sends the first call request information to a conference server, so that the conference server stores the identification information of the called terminal, and calls the called terminal according to the identification information of the called terminal, where the first call request information carries the identification information of the called terminal.

102: Call the called terminal according to the identification information of the called terminal, so that the called terminal receives a message which is published by another terminal in a current conference and that the called terminal publishes a message to another terminal in the current conference.

After the first call request information is received, the called terminal is called according to the identification information of the called terminal in the first call request information.

After the called terminal is called, the called terminal can receive a message which is published by another terminal in the current conference, and the called terminal is enabled to publish a message to another terminal in the current conference.

After the foregoing solution is used, there is no need calling the called terminal to join the conference using the conference server after examination of an administrator succeeds; and the called terminal can be called after the conference server is directly logged in to and corresponding communication information of the called terminal is provided for the server, which lowers complexity of a process of calling the called terminal, and simplifies a conference call process.

To make descriptions of this embodiment clearer, a system structure related in the method for calling a terminal to join a conference that is provided in this embodiment is first described in the following.

This embodiment may include: the calling terminal, the called terminal, the conference server, and a site.

Figure 2:
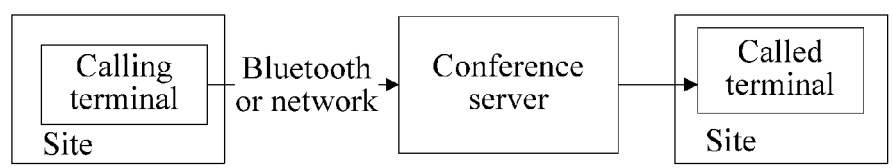
FIG. 2 is a schematic structural diagram of a system provided by an embodiment of the present invention.

The conference server provided in this embodiment is configured to receive call access request information sent by the calling terminal, and determine, according to the identification information of the called terminal in the call access request information, a site corresponding to the called terminal; and call the site corresponding to the called terminal, or call the called terminal. FIG. 2 is a schematic structural diagram of a system according to this embodiment.

Figure 3:
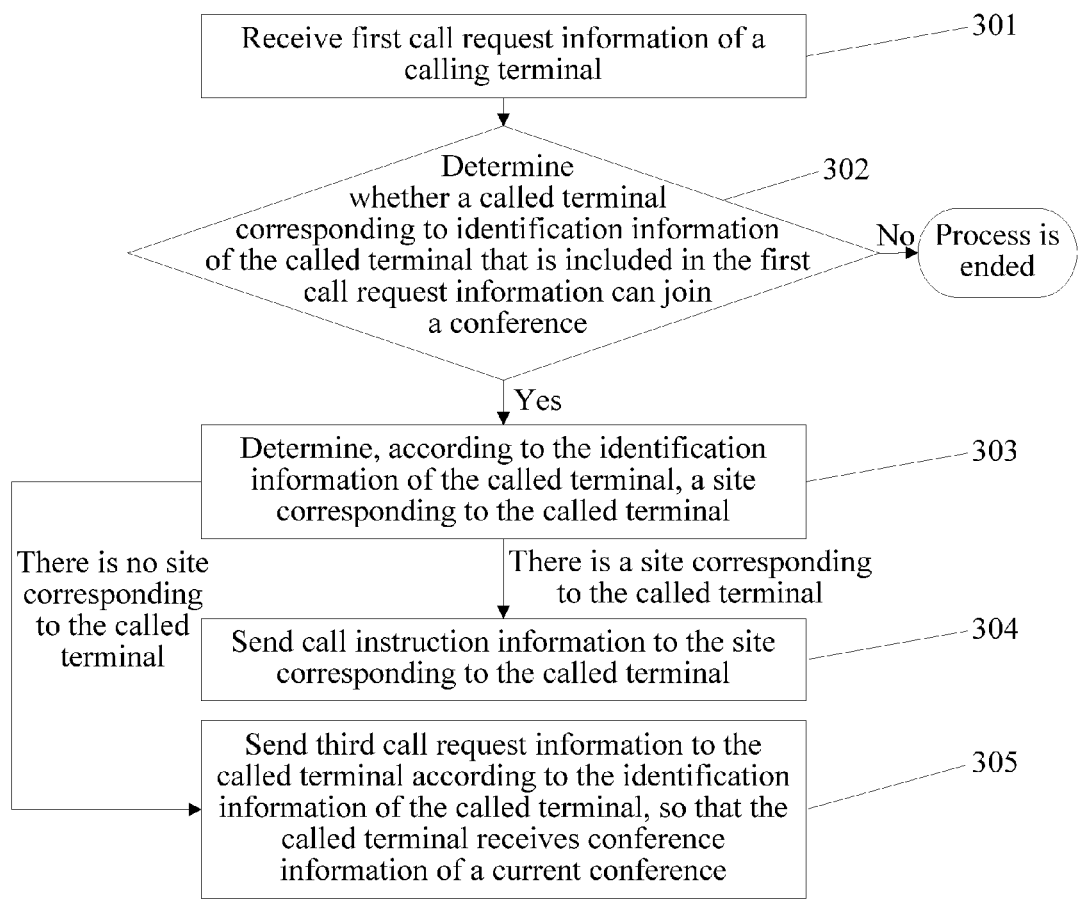
FIG. 3 is a flowchart of another method for calling a terminal to join a conference provided by an embodiment of the present invention.

This embodiment provides another method for calling a terminal to join a conference, where the method may be applied to a case that a calling terminal calls a called terminal to join the conference, and may also be applied to a case that the called terminal requests joining the conference; and this embodiment is described such that the calling terminal calls the called terminal as an example. As shown in FIG. 3, the method includes the following steps:

301: Receive first call request information.

Before the calling terminal calls the called terminal, the calling terminal first sends the first call request information to a conference server, so that the conference server stores identification information of the called terminal, and calls the called terminal according to the identification information of the called terminal, where the first call request information carries the identification information of the called terminal.

Content of the identification information of the terminal is not limited in this embodiment, and may be any content known by a person skilled in the art, and preferably, may be: a mobile phone number, fingerprint information, an IP address, or the like. The called terminal and the calling terminal that are provided in this embodiment may be a mobile phone, a tablet computer, or the like.

A type of the terminal is not limited in this embodiment, and may be any type known by a person skilled in the art, which is not described herein again.

Further, the first call request information may be sent by the calling terminal to the conference server using a remote user interface technology or a call control application.

If the method provided in this embodiment is that the called terminal requests joining the conference, the first call request information may be sent by the called terminal to the conference server using the remote user interface technology or the call control application.

Further, optionally, as an implementation manner of this embodiment, the first call request information may further be sent by the calling terminal to the conference server by means of Internet, Bluetooth, or an infrared ray.

If the method provided in this embodiment is that the called terminal requests joining the conference, the first call request information may further be sent by the called terminal to the conference server by means of Internet, Bluetooth, or an infrared ray.

A manner for the calling terminal to send the first call request information is not limited in this embodiment, and may be any manner known by a person skilled in the art, which is not described herein again.

302: Determine whether the called terminal corresponding to the identification information of the called terminal that is included in the first call request information can join the conference.

In some important conferences, it is possible that not all personnel are allowed to join. For example, in a high-level conference of a company, it is possible that only managers and superiors thereof are allowed to attend.

As an implementation manner of this embodiment, the conference server stores identification information of a called terminal that is allowed to join the current conference, and after receiving the first call request information, the conference server determines whether the identification information of the called terminal that is included in the first call request information is identification information of the called terminal that can join the current conference.

Further, if the identification information of the called terminal that is included in the first call request information is the identification information of the called terminal that can join the current conference, step 303 is performed; and if the identification information of the called terminal that is included in the first call request information is not the identification information of the called terminal that can join the current conference, the call is ended.

A method for determining whether the called terminal corresponding to the identification information of the called terminal that is included in the first call request information can join the conference is not limited in this embodiment, and may be any method known by a person skilled in the art, which is not described herein again.

303: Determine, according to the identification information of the called terminal, a site corresponding to the called terminal.

That the calling terminal calls the called terminal is implemented in a manner that the calling terminal calls, using the conference server, the site corresponding to the called terminal, and then the site calls the called terminal.

Further, optionally, the conference server determines, according to the identification information of the called terminal and stored information about a correspondence between the identification information of the called terminal and the site, the site corresponding to the called terminal.

Further, information about a correspondence between the calling terminal/called terminal and the site is stored in the conference server, and after receiving the first call request information, the conference server determines, according to the identification information of the called terminal in the first call request information, and the information about the correspondence between the called terminal and the site, the site corresponding to the called terminal.

Further, if the information about the correspondence between the called terminal and the site is stored in the conference server, it indicates that there is a site corresponding to the called terminal, and step 304 is performed; and if the information about the correspondence between the called terminal and the site is not stored in the conference server, it indicates that there is no site corresponding to the called terminal, and step 305 is performed.

304: Send call instruction information to the site corresponding to the called terminal.

The call instruction information is used to instruct the site to send second call request information to the called terminal, so that the called terminal can receive a message which is published by another terminal in the current conference and that the called terminal publishes a message to another terminal in the current conference, and the second call request information carries the identification information of the called terminal.

The process is ended.

305: Send third call request information to the called terminal according to the identification information of the called terminal, so that the called terminal receives a message which is published by another terminal in the current conference and that the called terminal publishes a message to another terminal in the current conference.

If information about a correspondence between the called terminal and the site is not stored in the conference server, that is, there is no site corresponding to the called terminal, the conference server directly calls the called terminal according to the identification information of the called terminal, so that the called terminal joins the current conference, that is, so that the called terminal receives a message which is published by another terminal in the current conference and that the called terminal publishes a message to another terminal in the current conference. The message published by the terminal may include at least one of the following: voice information, text information, and video information.

A type of information included in the message published by the terminal is not limited in this embodiment, and may be any type known by a person skilled in the art, which is not further described herein.

As an implementation manner of this embodiment, conference information may include conference content; and conference feedback information may include suggestions or discussion about the conference content.

Content included in the conference information and the conference feedback information is not limited in this embodiment, and may be set according to actual needs, which is not described herein again.

Figure 4:
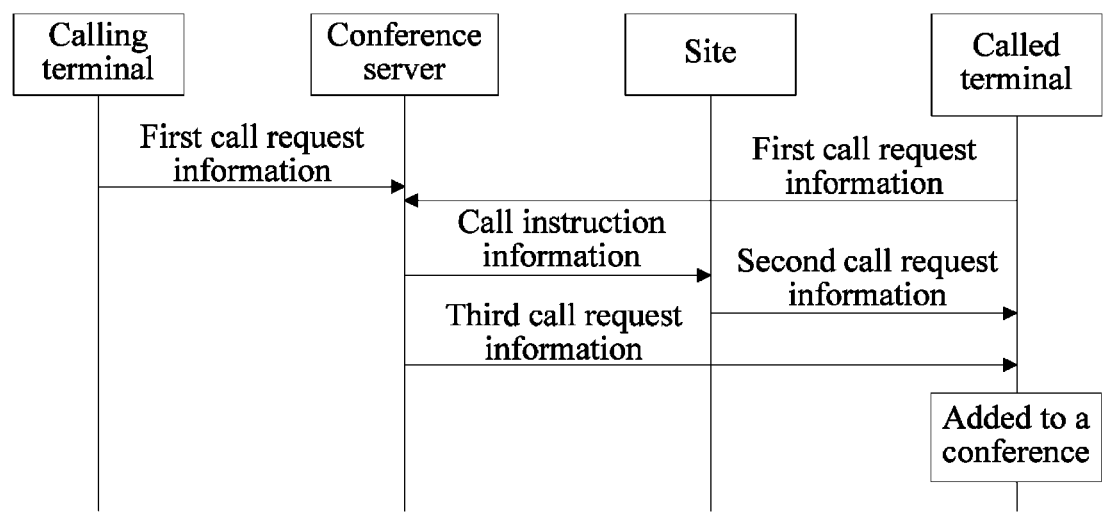
FIG. 4 is a flowchart of a part of a process of the method for calling a terminal to join a conference shown in FIG. 3.

To describe this embodiment more clearly, FIG. 4 is a schematic flowchart of the method according to this embodiment. A process of transferring information among the calling terminal, the called terminal, the site, and the conference server is described in the figure, and the "site" shown in the figure is the site corresponding to the called terminal.

After the foregoing solution is used, the conference server determines, according to the identification information of the called terminal in the first call request information, and the information about the correspondence between the called terminal and the site, the site corresponding to the called terminal, and calls the site corresponding to the called terminal, so that the calling terminal can directly call the called terminal using the conference server, or the called terminal can directly request joining the conference using the conference server without the need to further succeed in examination of an administrator, which lowers complexity of calling the called terminal by the calling terminal or of requesting joining the conference by the called terminal, and simplifies a conference call process.

The method described in this embodiment may further be applied to a case that the called terminal requests joining the current conference, which is not described herein again.

Figure 5:
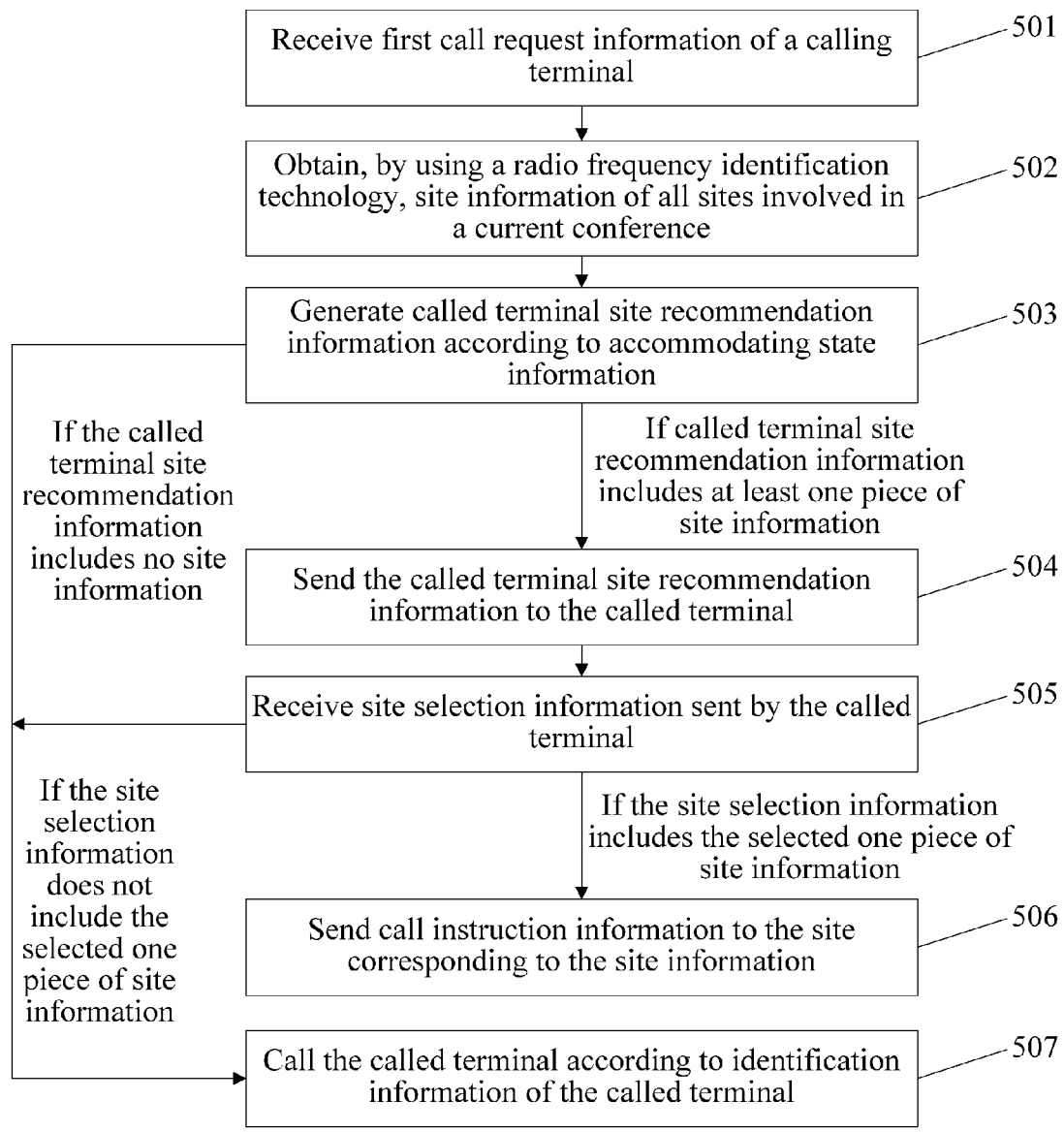
FIG. 5 is a flowchart of a method for calling a terminal to join a conference provided by an embodiment of the present invention, where site information is obtained using a radio frequency identification technology.

This embodiment provides another method for calling a terminal to join a conference, where the method may be applied to a case that a calling terminal calls a called terminal to join the conference, and may also be applied to a case that the called terminal requests joining the conference; and this embodiment is described such that that the calling terminal calls the called terminal as an example. As shown in FIG. 5, the method includes the following steps:

501: Receive first call request information.

In the conference, before calling the called terminal, the calling terminal first sends the first call request information to a conference server, so that the conference server stores identification information of the called terminal, and calls the called terminal according to the identification information of the called terminal, where the first call request information carries the identification information of the called terminal.

Figure 6:
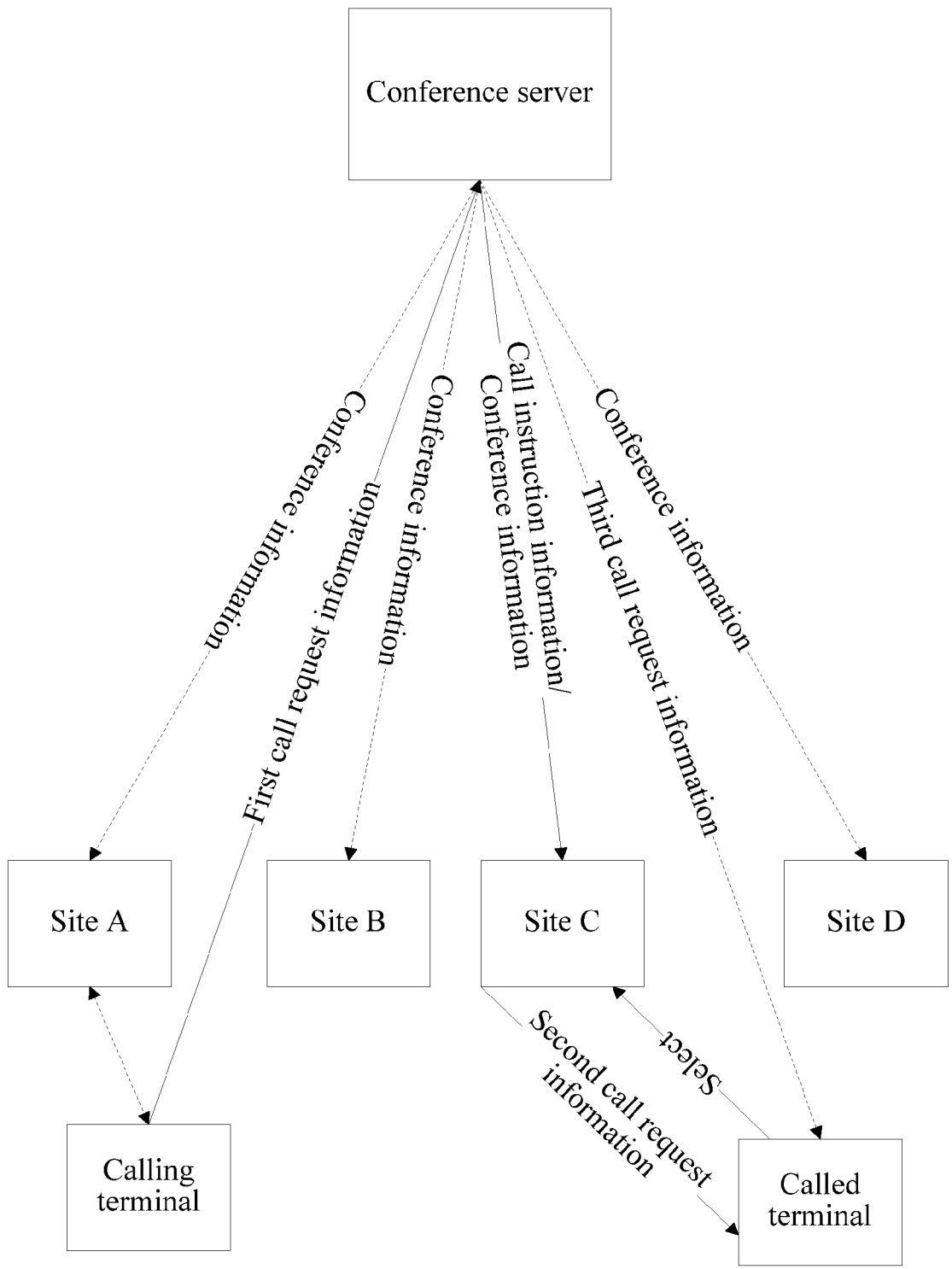
FIG. 6 is a schematic structural diagram of a system of the method for calling a terminal to join a conference shown in FIG. 5.

FIG. 6 is a schematic structural diagram of a system of the method according to this embodiment.

Content of the identification information of the terminal is not limited in this embodiment, and may be any content known by a person skilled in the art, and preferably, may be: a mobile phone number, fingerprint information, an IP address, or the like. The called terminal and the calling terminal that are provided in this embodiment may be a mobile phone, a tablet computer, or the like.

A type of the terminal is not limited in this embodiment, and may be any type known by a person skilled in the art, which is not described herein again.

Further, the first call request information may be sent by the calling terminal to the conference server using a remote user interface technology or a call control application.

If the method provided in this embodiment is that the called terminal requests joining the conference, the first call request information may be sent by the called terminal to the conference server using the remote user interface technology or the call control application.

Further, optionally, as an implementation manner of this embodiment, the first call request information may further be sent by the calling terminal to the conference server by means of Internet, Bluetooth, or an infrared ray.

If the method provided in this embodiment is that the called terminal requests joining the conference, the first call request information may further be sent by the called terminal to the conference server by means of Internet, Bluetooth, or an infrared ray.

A manner for the calling terminal to send the first call request information is not limited in this embodiment, and may be any manner known by a person skilled in the art, which is not described herein again.

502: Obtain, using a radio frequency identification technology, site information of all sites involved in a current conference.

The site information may include accommodating state information of the sites, location information of the sites, conference signal strength information sent by the sites, and the like.

That the calling terminal calls the called terminal is implemented in a manner that the calling terminal calls, using the conference server, a site corresponding to the called terminal, and then the site calls the called terminal.

Therefore, as an implementation manner of this embodiment, the conference server first needs to obtain site information corresponding to the called terminal, and then determines the site corresponding to the called terminal.

The Radio Frequency Identification (RFID) technology, which is also referred to as an electronic label or radio frequency identification, is a communications technology, in which a specific target may be identified and relevant data may be read/written using a radio signal, and there is no need to establish a mechanical or optical contact between an identification system and the specific target.

Further, optionally, the conference server obtains, using the RFID technology, the site information of the sites involved in the current conference.

Further, the conference server positions, according to the identification information of the called terminal and the RFID technology, locations of the called terminal and the sites involved in the current conference, and obtains the site information of the called terminal and the sites involved in the current conference.

As an implementation manner of this embodiment, an RFID label is used when an object is positioned, and the RFID label may be set on the conference server, on the called terminal, or near the sites. The conference server positions the called terminal and the sites using the RFID technology, that is, positions RFID labels on the called terminal and near the sites, and information of locations where the called terminal and the sites are located may be obtained by positioning.

Content included in the site information is not limited in this embodiment, and may be set according to actual needs, which is not described herein again.

The RFID technology provided in this embodiment is known by a person skilled in the art, which is not described herein.

503: Generate called terminal site recommendation information according to the accommodating state information.

The number of terminals that join the conference and can be accommodated in each site is limited, and when the number of terminals that join the conference and are accommodated in the site reaches an upper limit value, an accommodating state of the site is saturated, and another terminal cannot be called to access the site; and if the number of terminals that join the conference and are accommodated in the site does not reach the upper limit value, the accommodating state of the site is unsaturated, and another terminal may be called to access the site.

As an exemplary implementation manner of this embodiment, to make site information in the called terminal site recommendation information that is obtained by the called terminal be site information corresponding to a site that can be accessed, the site information included in the called terminal site recommendation information is site information of a site in an unsaturated accommodating state.

Further, optionally, the conference server may further determine the site information included in the called terminal site recommendation information according to at least one of the following: a strength of a signal sent by a site, and a distance between a site and the called terminal.

For example, the called terminal site recommendation information only includes information of sites with a signal strength being strong and with a signal strength being medium, or, includes information of a site with a distance from the called terminal shorter than 5000 meters, or, includes information of sites with a signal strength being strong and with a signal strength being medium, and with a distance from the called terminal shorter than 5000 meters.

As an implementation manner of this embodiment, the called terminal site recommendation information may be in a form of a list.

Further, the conference server obtains location information of the sites and the called terminal according to the RFID technology, calculates information of relative locations between the called terminal and the sites according to the location information, determines site information, of a site with a relative location being shorter than a preset distance, as the site information included in the called terminal site recommendation information, and if the site information of a site with a relative location being shorter than the preset distance does not exist, obtains site information of a site with a relative location being shorter than twice the preset distance, and determines the site information as the site information included in the called terminal site recommendation information.

As an implementation manner of this embodiment, if the called terminal site recommendation information includes at least two pieces of site information, the conference server arranges the site information included in the called terminal site recommendation information in ascending order/descending order of numerical values of relative locations between the site and the called terminal.

For example, the called terminal site recommendation information received by the called terminal is in a form of a list, which is shown in the following table:

| Site number | Location of the site | Distance from a monitored terminal | Signal strength | The number of currently accommodated persons |
| --- | --- | --- | --- | --- |
| 1 | Dongcheng District | 100 meters | Strong | 109 |
| 2 | Chaoyang District | 234 meters | Medium | 343 |
| 3 | Fengtai District | 254 meters | Medium | 643 |
| 4 | Haidian District | 286 meters | Weak | 652 |
| 5 | Xicheng District | 298 meters | Weak | 233 |

As an implementation manner of this embodiment, the preset distance may be 100 meters, 200 meters, 300 meters, or the like.

The preset distance is not limited in this embodiment, and may be set according to actual needs, which is not described herein again.

A format of the called terminal site recommendation information is not limited in this embodiment, and may be set according to actual needs, which is not described herein again.

A manner for determining the site information included in the called terminal site recommendation information is not limited in this embodiment, and may be set according to actual needs, which is not described herein again.

If the called terminal site recommendation information includes no site information, the conference server obtains no site information, that is, there is no site corresponding to the called terminal.

If the called terminal site recommendation information includes at least one piece of site information, step 504 is performed; and if the called terminal site recommendation information includes no site information, step 507 is performed.

504: Send the called terminal site recommendation information to the called terminal.

The called terminal site recommendation information is sent to the called terminal, so that the called terminal selects one piece of site information corresponding to the called terminal from the site information included in the called terminal site recommendation information.

505: Receive site selection information sent by the called terminal.

After selecting corresponding site information, the called terminal sends the site selection information to the conference server for notifying the conference server which site is selected by the called terminal for accessing, where the site selection information includes one piece of site information selected by the called terminal, and the one piece of site information selected by the called terminal is site information of a site corresponding to the called terminal.

Further, if the called terminal site recommendation information includes at least one piece of site information, and the site selection information includes the selected one piece of site information, the conference server obtains the site information, that is, there is a site corresponding to the called terminal; and if the called terminal site recommendation information includes at least one piece of site information, and the site selection information does not include one piece of site information selected, the conference server obtains no site information, that is, there is no site corresponding to the called terminal.

Further, if the site selection information includes the selected one piece of site information, step 506 is performed; and if the site selection information does not include the selected one piece of site information, step 507 is performed.

506: Send call instruction information to the site corresponding to the site information, so that the site calls the called terminal, so that the called terminal joins the current conference.

If the site information corresponding to the called terminal is obtained, the call instruction information is sent, according to the site information, to the site corresponding to the site information.

The call instruction information is used to instruct the site to send second call request information to the called terminal, so that the called terminal receives a message which is published by another terminal in a current conference and that the called terminal publishes a message to another terminal in the current conference, and the second call request information carries the identification information of the called terminal.

The process is ended.

507: Call the called terminal according to the identification information of the called terminal, so that the called terminal receives a message which is published by another terminal in the current conference and that the called terminal publishes a message to another terminal in the current conference.

If the site selection information sent by the called terminal is not received, or, even though the site selection information sent by the called terminal is received, the site selection information does not include the selected one piece of site information, the conference server obtains no site information, that is, there is no site corresponding to the called terminal.

Further, if there is no site corresponding to the called terminal, the conference server directly calls the called terminal according to the identification information of the called terminal, so that the called terminal joins the current conference, that is, so that the called terminal receives a message which is published by another terminal in the current conference and that the called terminal publishes a message to another terminal in the current conference.

After the foregoing solution is used, the conference server determines, according to the identification information of the called terminal in the first call request information and the RFID technology, the site corresponding to the called terminal, and calls the site, so that the calling terminal can directly call the called terminal using the conference server, or the called terminal can directly request joining the conference using the conference server without the need to further succeed in examination of an administrator, which lowers complexity of a call process, and simplifies a conference call process.

The method described in this embodiment may further be applied to a case that the called terminal requests joining the conference, which is not described herein again.

Figure 7:
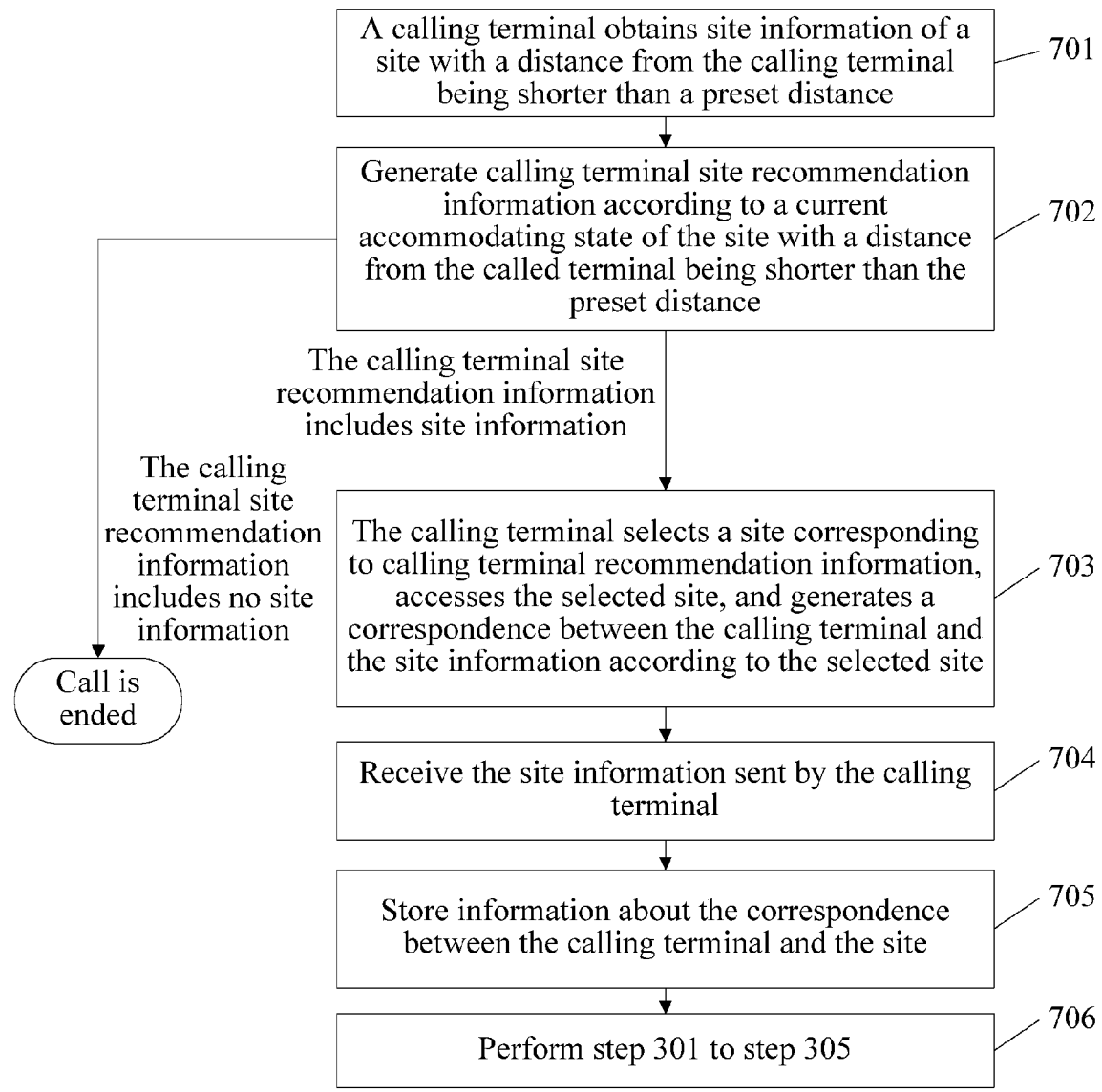
FIG. 7 is a flowchart of a method for calling a terminal to join a conference provided by an embodiment of the present invention, where site information is obtained using a Call Control Application (CCA)

This embodiment provides a method for calling a terminal to join a conference. In the method, a calling terminal does not access a site before calling a called terminal, and after obtaining information of a site that can be accessed, the calling terminal selects a corresponding site for accessing. This embodiment is described such that that the calling terminal calls the called terminal as an example. As shown in FIG. 7, the method includes the following steps:

701: The calling terminal obtains site information of a site with a distance from the calling terminal shorter than a preset distance.

The preset distance is a maximum distance that can be covered by a current conference signal sent by the site, and the site information of the site with a distance from the calling terminal shorter than the preset distance is obtained by the calling terminal using a call control application, and is then sent to a conference server.

Further, optionally, the calling terminal obtains information of a surrounding site using a call control application installed on the calling terminal, and the obtained current conference signal transmitted by the site may be received by the calling terminal; and the calling terminal can receive the conference signal sent by the site, as long as the distance between the calling terminal and the site is shorter than the maximum distance that can be covered by the conference signal transmitted by the site.

Further, the conference server obtains the site information of a site with a distance from the calling terminal shorter than the preset distance, and conference information sent by the site corresponding to the site information can be received by the calling terminal.

Figure 8:
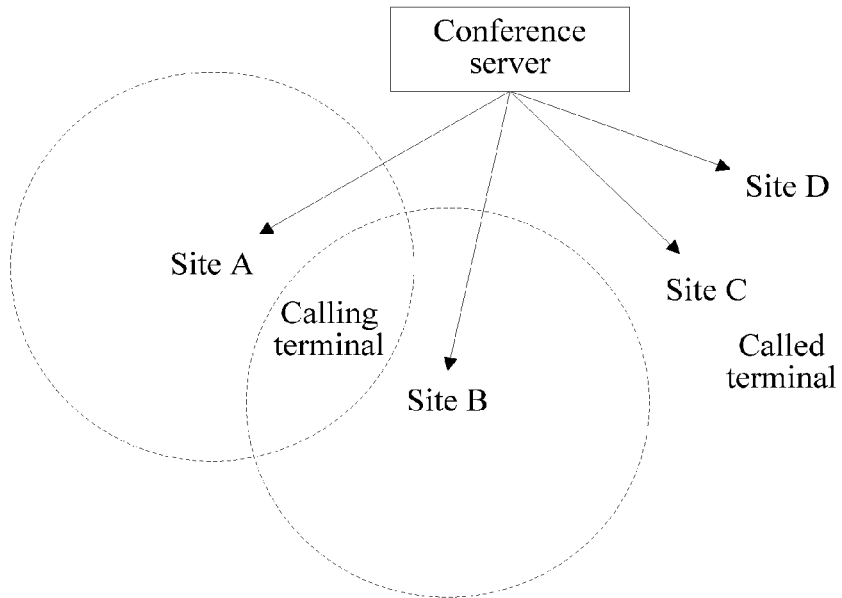
FIG. 8 is a schematic structural diagram of a system of the method for calling a terminal to join a conference shown in FIG. 7.

FIG. 8 is a schematic structural diagram of a system of the method according to this embodiment. As shown in FIG. 8, a dashed circle indicates a range that can be covered by the conference signal sent by the site, and the calling terminal can receive conference signals sent by a site A and a site B.

702: Generate calling terminal site recommendation information according to a current accommodating state of the site with a distance from the calling terminal shorter than the preset distance.

The calling terminal site recommendation information includes site information of a site in an unsaturated accommodating state and with a distance from the calling terminal shorter than the preset distance; and the site information includes accommodating state information of the site, location information of the site, and conference signal strength information sent by the site.

A method and a process for generating the calling terminal site recommendation information in this step is the same as the method and the process for generating the called terminal site recommendation information in step 503, which are not described herein again.

A format of the calling terminal site recommendation information is not limited in this embodiment, and may be set according to actual needs, which is not described herein again.

Further, if the calling terminal site recommendation information includes site information, step 703 is performed; and if the calling terminal site recommendation information includes no site information, the call is ended.

703: The calling terminal selects site information corresponding to one calling terminal from the site information included in the calling terminal site recommendation information, and accesses a site corresponding to the selected site information.

A calling party is a user using the calling terminal, and the calling party may select, according to calling terminal site recommendation information received by the calling terminal and actual situations, a proper site for accessing.

For example, the calling party selects, according to a current traffic condition, a site that can be reached rapidly for accessing; or, the calling party selects, according to current accommodating states of sites, a site with a smallest number of current accesses for accessing.

Further, as an implementation manner of this embodiment, the calling party holds the calling terminal, and a list of the calling terminal site recommendation information is displayed on an interface of the calling terminal; and after clicking corresponding site information on the interface of the calling terminal, the calling party selects a corresponding site for accessing, and the calling terminal sends the site information to the conference server, where the site corresponding to the site information is a site corresponding to the calling terminal.

After the calling terminal accesses the corresponding site, the calling may be enabled to receive a message which is published by another terminal in a current conference, and the calling terminal may be enabled to publish a message to another terminal in the current conference.

A manner for the calling party to select the site is not limited in this embodiment, and may be set according to actual needs, which is not described herein again.

704: Receive the site information sent by the calling terminal.

The site information sent by the calling terminal is received, and information about a correspondence between the calling terminal and the site is generated according to the accessed site. A site in the information about the correspondence is the site corresponding to the calling terminal, and the site information sent by the calling terminal to the conference server is site information of the site corresponding to the calling terminal.

705: Store the correspondence between the calling terminal and the site information.

The information about the correspondence between the calling terminal and the site is stored, so that the conference server determines, according to information about a correspondence between the calling/called terminal and the site, a site corresponding to the calling/called terminal.

706: Perform step 301 to step 305.

Figure 9:
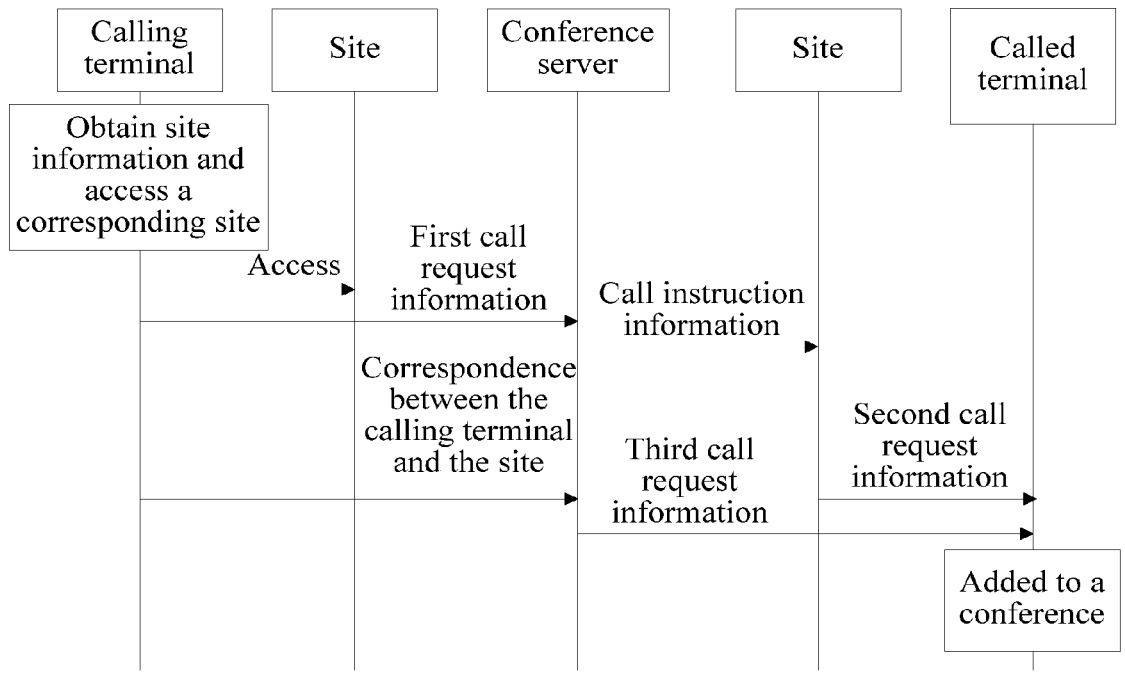
FIG. 9 is a flowchart of a part of a process of the method for calling a terminal to join a conference shown in FIG. 7.

To describe the steps in this embodiment more clearly, FIG. 9 is a flowchart of the method according to this embodiment. A process of transferring information among the calling terminal, the called terminal, the sites, and the conference server is described in the figure, and the "site" shown in the left of the figure is the site corresponding to the calling terminal; and the "site" shown in the right of the figure is the site corresponding to the called terminal.

After the foregoing solution is used, the conference server determines, according to the identification information of the called terminal in the first call request information, and the information about the correspondence between the called terminal and the site, the site corresponding to the called terminal, and calls the site corresponding to the called terminal, so that the calling terminal can directly call the called terminal using the conference server, or the called terminal can directly request joining the conference using the conference server without the need to further succeed in examination of an administrator, which lowers complexity of calling the called terminal by the calling terminal or of requesting joining the conference by the called terminal, and simplifies a conference call process.

Figure 10:
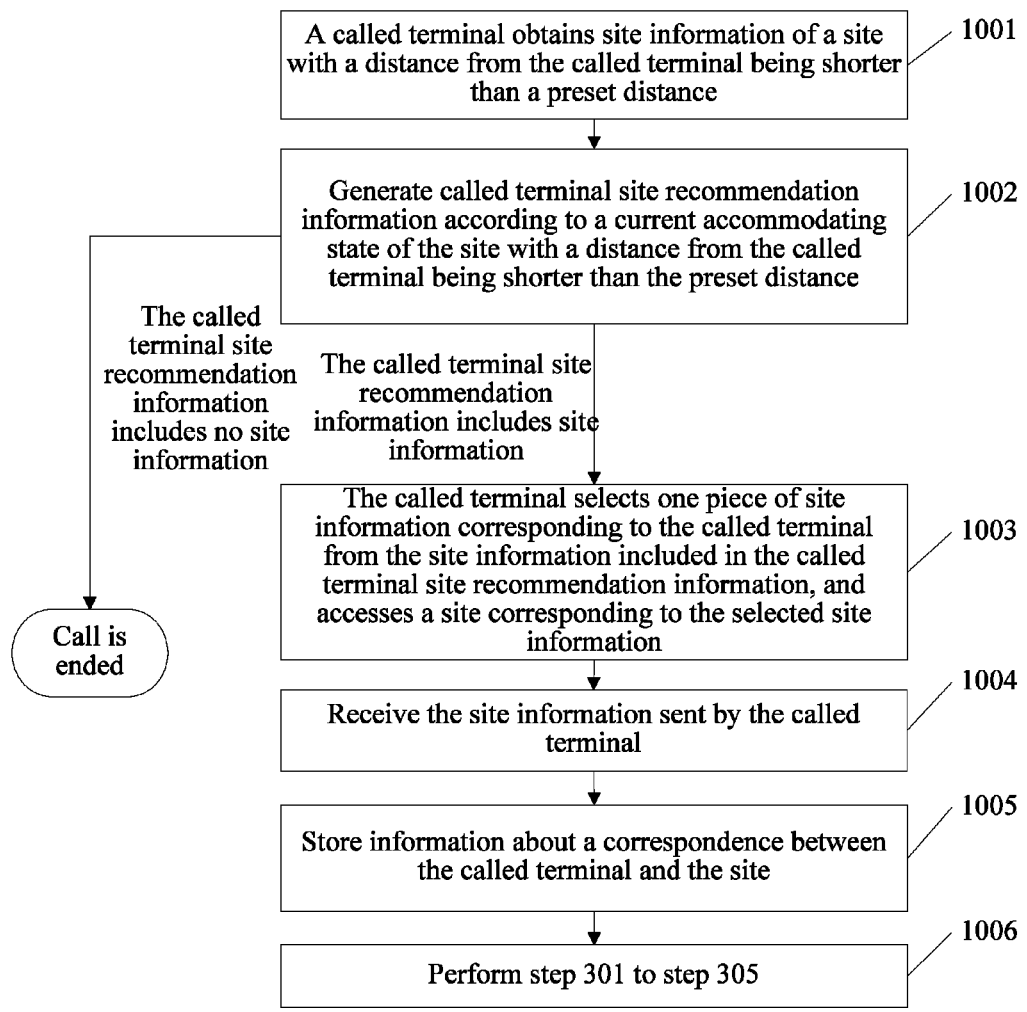
FIG. 10 is a flowchart of a method for a called terminal to request joining a conference.

This embodiment provides a method for calling a terminal to join a conference. In the method, that a called terminal requests joining the conference is used as an example. Before the called terminal requests joining the conference and after the called terminal obtains information of a site that can be accessed, the called terminal selects one site for accessing. As shown in FIG. 10, the method includes the following steps:

1001: The called terminal obtains site information of a site with a distance from the called terminal shorter than a preset distance.

The preset distance is a maximum distance that can be covered by a current conference signal sent by a site, and the site information of a site with a distance from the called terminal shorter than the preset distance is obtained by the called terminal using a call control application, and is then sent to a conference server.

Further, optionally, the called terminal obtains information of a site around using a call control application installed on the called terminal, and the obtained current conference signal transmitted by the site can be received by the called terminal; and the called terminal can receive the conference signal sent by a site, as long as a distance between the called terminal and the site is shorter than the maximum distance that can be covered by the conference signal transmitted by the site.

Further, the conference server obtains the site information of a site with a distance from the called terminal shorter than the preset distance, and conference information sent by the site corresponding to the site information can be received by the called terminal.

1002: Generate called terminal site recommendation information according to a current accommodating state of the site with a distance from the called terminal shorter than the preset distance.

The called terminal site recommendation information includes site information of a site in an unsaturated accommodating state and with a distance from the called terminal shorter than the preset distance; and the site information includes accommodating state information of the site, location information of the site, and conference signal strength information sent by the site.

A method and a process for generating the called terminal site recommendation information in this step is the same as the method and the process for generating the called terminal site recommendation information in step 503, which are not described herein again.

Further, if the called terminal site recommendation information includes site information, step 1003 is performed; and if the called terminal site recommendation information includes no site information, it indicates that there is no site corresponding to the called terminal, and the call is ended.

A format of the called terminal site recommendation information is not limited in this embodiment, and may be set according to actual needs, which is not described herein again.

1003: The called terminal selects one piece of site information corresponding to the called terminal from the site information included in the called terminal site recommendation information, and accesses a site corresponding to the selected site information.

A called party is a user using the called terminal, and the called party may select, according to called terminal recommendation information received by the called terminal and actual situations, a proper site for accessing.

For example, the called party selects, according to a current traffic condition, a site that can be reached rapidly for accessing; or, the called party selects, according to current accommodating states of sites, a site with a smallest number of current accesses for accessing.

Further, as an implementation manner of this embodiment, the called party holds the called terminal, and a list of the called terminal site recommendation information is displayed on an interface of the called terminal; and after clicking corresponding site information on the interface of the called terminal, the called party selects a corresponding site for accessing, and the called terminal sends the site information to the conference server, where the site corresponding to the site information is a site corresponding to the called terminal.

A manner for the called party to select the site is not limited in this embodiment, and may be set according to actual needs, which is not described herein again.

1004: Receive the site information sent by the called terminal.

The site information sent by the called terminal is received, and information about a correspondence between the called terminal and the site is generated according to the accessed site. A site in the information about the correspondence is the site corresponding to the called terminal, and the site information sent by the called terminal to the conference server is site information of the site corresponding to the called terminal.

1005: Store the correspondence between the called terminal and the site information.

The information about the correspondence between the called terminal and the site is stored, so that the conference server determines, according to information about a correspondence between the calling/called terminal and the site, a site corresponding to the calling/called terminal.

1006: Perform step 301 to step 305.

Step 301 is receiving first access request information sent by the called terminal.

After the foregoing solution is used, the called terminal can directly request adding the called terminal to the conference using the conference server, so that the called terminal receives a message which is published by another terminal in a current conference and that the called terminal publishes a message to another terminal in the current conference without the need to further succeed in examination of an administrator, which lowers complexity of a process of calling the called terminal by the calling terminal, and simplifies a conference call process.

Figure 11:
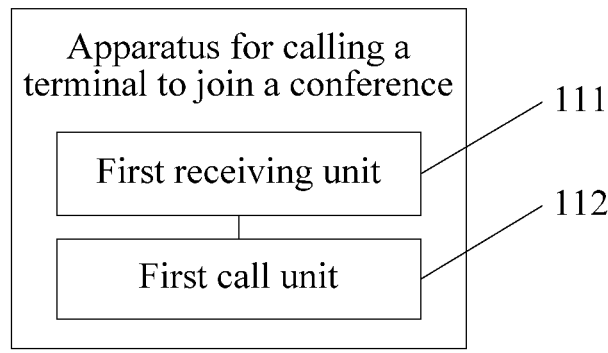
FIG. 11 is a schematic structural diagram of an apparatus for calling a terminal to join a conference provided by an embodiment of the present invention.

This embodiment provides an apparatus for calling a terminal to join a conference. As shown in FIG. 11, the apparatus includes a first receiving unit 111 and a first call unit 112.

The first receiving unit 111 is configured to receive first call request information, where the first call request information carries identification information of a called terminal.

The first call unit 112 is configured to call the called terminal according to the identification information of the called terminal, so that the called terminal receives a message which is published by another terminal in a current conference and that the called terminal publishes a message to another terminal in the current conference.

After the foregoing solution is used, the first call unit does not need to call the called terminal to join the conference using a conference server after examination of an administrator succeeds; and the called terminal can be called after the conference server is directly logged in to and corresponding communication information of the called terminal is provided for the server, which lowers complexity of a process of calling the called terminal, and simplifies a conference call process.

Figure 12:
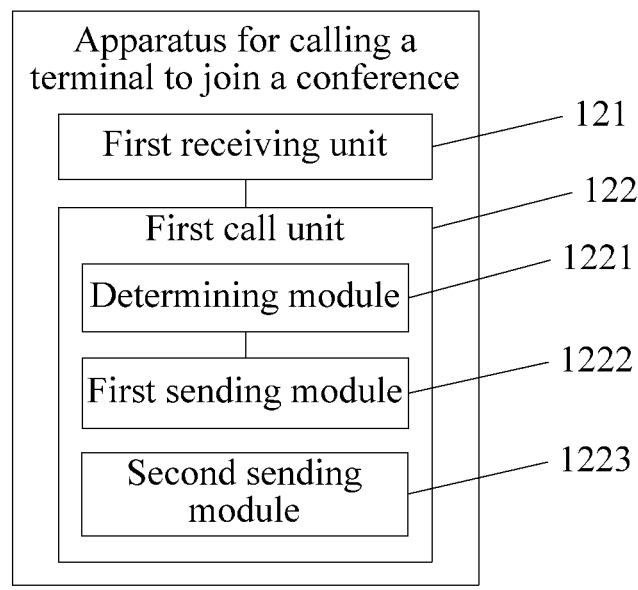
FIG. 12 is a schematic structural diagram of another apparatus for calling a terminal to join a conference provided by an embodiment of the present invention.

This embodiment provides another apparatus for calling a terminal to join a conference. The apparatus may be applied to a case that a calling terminal calls a called terminal to join the conference, and may also be applied to a case that a called terminal requests joining the conference. As shown in FIG. 12, the apparatus includes a first receiving unit 121 and a first call unit 122.

Further, the first call unit 122 includes: a determining module 1221, a first sending module 1222, and a second sending module 1223.

The first receiving unit 121 is configured to receive first call request information, where the first call request information carries identification information of the called terminal.

Further, the first call request information received by the first receiving unit may be sent by the calling terminal to a conference server using a remote user interface technology or a call control application.

Further, optionally, as an implementation manner of this embodiment, the first call request information received by the first receiving unit may further be sent by the calling terminal to the conference server by means of Internet, Bluetooth, or an infrared ray.

If the method provided in this embodiment is that the called terminal requests joining the conference, the first call request information may further be sent by the called terminal to the conference server by means of Internet, Bluetooth, or an infrared ray.

A manner for the calling terminal to send the first call request information is not limited in this embodiment, and may be any manner known by a person skilled in the art, which is not described herein again.

The first call unit 122 is configured to call the called terminal according to the identification information of the called terminal, so that the called terminal receives a message which is published by another terminal in a current conference and that the called terminal publishes a message to another terminal in the current conference.

Further, the determining module 1221 is configured to determine, according to the identification information of the called terminal that is received by the first receiving unit, a site corresponding to the called terminal.

That the calling terminal calls the called terminal is implemented in a manner that the calling terminal calls, using the conference server, the site corresponding to the called terminal, and then the site calls the called terminal.

Further, optionally, the determining module determines, according to the stored identification information of the called terminal and information about a correspondence between the identification information of the called terminal and the site, a site corresponding to the called terminal.

The first sending module 1222 is configured to, if there is a site corresponding to the called terminal, send call instruction information to the site corresponding to the called terminal, where the call instruction information is used to instruct the site to send second call request information to the called terminal, so that the called terminal receives the message which is published by another terminal in the current conference and that the called terminal publishes a message to another terminal in the current conference, and the second call request information carries the identification information of the called terminal.

After determining the site corresponding to the called terminal, the determining module calls the site, so that the site calls the called terminal, so that the called terminal accesses the site, and then joins the current conference, that is, so that the called terminal receives the message which is published by another terminal in the current conference and that the called terminal publishes the message to another terminal in the current conference.

Further, as an implementation manner of this embodiment, the first sending module sends the call instruction information to the site corresponding to the site information, so that the site sends the second call request information to the called terminal.

The second sending module 1223 is configured to, if there is no site corresponding to the called terminal, send third call request information to the called terminal according to the identification information of the called terminal.

If there is no site corresponding to the called terminal, the called terminal receives no conference information sent by a site, and can only receive conference information sent by the conference server, after the second sending module sends the third call request information, so that the called terminal receives the message which is published by another terminal in the current conference and that the called terminal publishes a message to another terminal in the current conference.

After the foregoing solution is used, the first call unit determines, according to the identification information of the called terminal in the first call request information, and the information about the correspondence between the called terminal and the site, the site corresponding to the called terminal, and calls the site, so that the calling terminal can directly call the called terminal using the conference server without the need to further succeed in examination of an administrator, which lowers complexity of a process of calling the called terminal by the calling terminal, and simplifies a conference call process.

Figure 13:
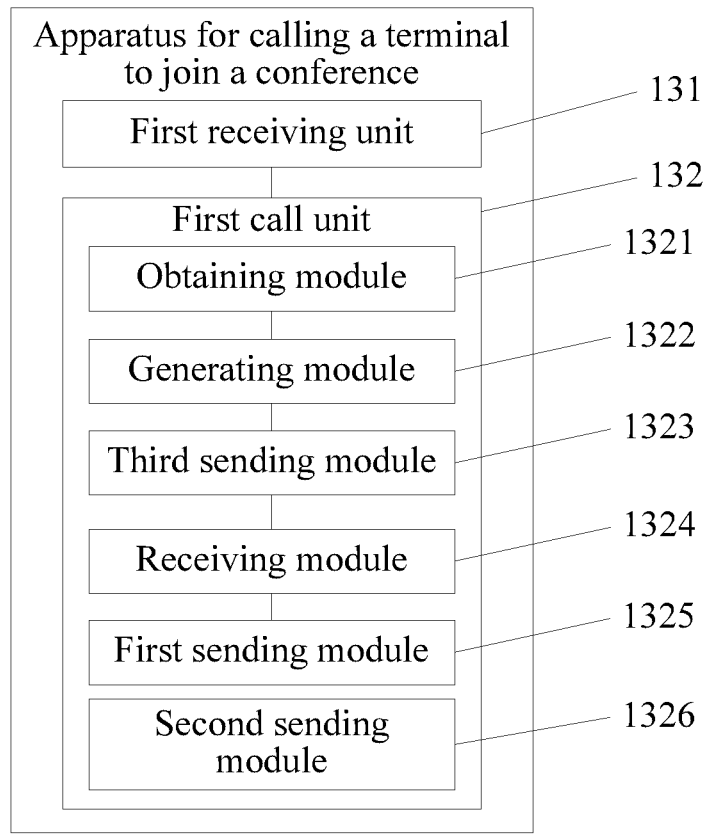
FIG. 13 is a schematic structural diagram of an apparatus for calling a terminal to join a conference provided by an embodiment of the present invention, where site information is obtained using a radio frequency identification technology.

This embodiment provides another apparatus for calling a terminal to join a conference. The apparatus may be applied to a case that a calling terminal calls a called terminal to join the conference, and may also be applied to a case that a called terminal requests joining the conference. As shown in FIG. 13, the apparatus includes a first receiving unit 131 and a first call unit 132.

Further, the first call unit 132 includes: an obtaining module 1321, a generating module 1322, a third sending module 1323, a receiving module 1324, a first sending module 1325, and a second sending module 1326.

The first receiving unit 131 is configured to receive first call request information of the calling terminal, where the first call request information carries identification information of the called terminal.

Further, the first call request information received by the first receiving unit may be sent by the calling terminal to a conference server using a remote user interface technology or a call control application.

If the apparatus provided in this embodiment is applied to a case that the called terminal requests joining the conference, the first call request information may be sent by the called terminal to the conference server using the remote user interface technology or the call control application.

Further, optionally, as an implementation manner of this embodiment, the first call request information received by the first receiving unit may further be sent by the calling terminal to the conference server by means of Internet, Bluetooth, or an infrared ray.

If the apparatus provided in this embodiment is applied to a case that the called terminal requests joining the conference, the first call request information may further be sent by the called terminal to the conference server by means of Internet, Bluetooth, or an infrared ray.

A manner for the calling terminal to send the first call request information is not limited in this embodiment, and may be any manner known by a person skilled in the art, which is not described herein again.

The first call unit 132 is configured to call the called terminal according to the identification information of the called terminal that is received by the first receiving unit, so that the called terminal receives a message which is published by another terminal in a current conference and that the called terminal publishes a message to another terminal in the current conference.

The obtaining module 1321 is configured to obtain, using a radio frequency identification technology, site information of all sites that are involved in the current conference, where the site information includes accommodating state information of the sites, location information of the sites, and conference signal strength information sent by the sites.

The generating module 1322 is configured to generate called terminal site recommendation information according to the accommodating state information obtained by the obtaining module, where the called terminal site recommendation information includes site information of a site in an unsaturated accommodating state and in the current conference.

The third sending module 1323 is configured to, if the called terminal site recommendation information generated by the generating module includes site information of at least one site, send the called terminal site recommendation information to the called terminal, so that the called terminal selects, according to the called terminal site recommendation information, one piece of site information corresponding to the called terminal from the site information of the site in an unsaturated accommodating state and in the current conference.

The receiving module 1324 is configured to receive site selection information sent by the called terminal, where the site selection information includes the selected one piece of site information corresponding to the called terminal.

The first sending module 1325 is configured to, if there is a site corresponding to the called terminal, send call instruction information to the site corresponding to the called terminal, where the call instruction information is used to instruct the site to send second call request information to the called terminal, and the second call request information carries the identification information of the called terminal.

If the site selection information received by the receiving module includes the selected one piece of site information corresponding to the called terminal, there is a site corresponding to the called terminal.

The second sending module 1326 is configured to, if there is no site corresponding to the called terminal, send third call request information to the called terminal according to the identification information of the called terminal.

If the site selection information received by the receiving module does not include the selected one piece of site information corresponding to the called terminal, there is no site corresponding to the called terminal.

If there is no site corresponding to the called terminal, the called terminal receives no conference information sent by a site, and can only receive conference information sent by the conference server, after the second sending module sends third call request information.

After the foregoing solution is used, the first call unit determines, according to the identification information of the called terminal in the first call request information and an RFID technology, the site corresponding to the called terminal, and calls the site, so that the calling terminal can directly call the called terminal using the conference server without the need to further succeed in examination of an administrator, which lowers complexity of a process of calling the called terminal by the calling terminal, and simplifies a conference call process.

Figure 14:
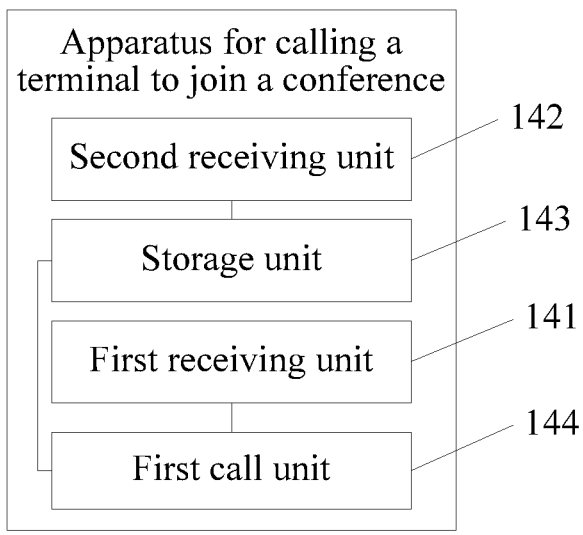
FIG. 14 is a schematic structural diagram of an apparatus for calling a terminal to join a conference provided by an embodiment of the present invention, where site information is obtained using a CCA.

This embodiment provides another apparatus for calling a terminal to join a conference. The apparatus may be applied to a case that a calling terminal calls a called terminal to join the conference, and may also be applied to a case that a called terminal requests joining the conference. As shown in FIG. 14, the apparatus includes a first receiving unit 141, a second receiving unit 142, a storage unit 143, and a first call unit 144.

The first receiving unit 141 is configured to receive first call request information, where the first call request information carries identification information of the called terminal.

Further, the first call request information received by the first receiving unit may be sent by the calling terminal to a conference server using a remote user interface technology or a call control application.

If the apparatus provided in this embodiment is applied to a case that the called terminal requests joining the conference, the first call request information may be sent by the called terminal to the conference server using the remote user interface technology or the call control application.

Further, optionally, as an implementation manner of this embodiment, the first call request information received by the first receiving unit may further be sent by the calling terminal to the conference server by means of Internet, Bluetooth, or an infrared ray.

If the apparatus provided in this embodiment is applied to a case that the called terminal requests joining the conference, the first call request information may further be sent by the called terminal to the conference server by means of Internet, Bluetooth, or an infrared ray.

A manner for the calling terminal to send the first call request information is not limited in this embodiment, and may be any manner known by a person skilled in the art, which is not described herein again.

The second receiving unit 142 is configured to receive site information sent by the calling terminal, where a site corresponding to the site information is a site corresponding to the calling terminal.

If the apparatus provided in this embodiment is applied to a case that the called terminal requests joining the conference, the second receiving unit is configured to receive site information sent by the called terminal, where a site corresponding to the site information is a site corresponding to the called terminal.

Further, the site information corresponding to the calling terminal and received by the second receiving unit is determined, after the calling terminal obtains, using the call control application, site information of a site with a distance from the calling terminal shorter than a preset distance, by the calling terminal by selecting a piece of site information from the site information of the site with a distance from the calling terminal shorter than the preset distance.

The storage unit 143 is configured to store information about a correspondence between the calling terminal and the site.

If the apparatus provided in this embodiment is applied to a case that the called terminal requests joining the conference, the storage unit is configured to store a correspondence between the called terminal and the site information.

The storage unit stores the correspondence between the calling terminal and the site information, so that the conference server obtains, according to the correspondence between the calling/called terminal and the site information, the site information corresponding to the calling/called terminal.

The first call unit 144 is configured to call the called terminal according to the identification information of the called terminal, so that the called terminal receives a message which is published by another terminal in a current conference and that the called terminal publishes a message to another terminal in the current conference.

After the foregoing solution is used, in one aspect, the first call unit obtains, according to the identification information of the called terminal in the first call request information, and the information about the correspondence between the called terminal and the site, the site information corresponding to the called terminal, and calls the corresponding site according to the site information, so that the calling terminal can directly call the called terminal using the conference server; and in another aspect, the second call unit obtains, according to identification information of a second called terminal in fourth call request information, and information about a correspondence between the second called terminal and the site, site information corresponding to the second called terminal, and calls the corresponding site according to the site information, so that the second called terminal can directly call the second called terminal itself using the conference server without the need to further succeed in examination of an administrator, which lowers complexity of a process of calling the called terminal using the calling terminal, and simplifies a conference call process.

Through the descriptions of the foregoing implementation manners, a person skilled in the art may clearly understand that the present invention may be implemented by means of software, or by means of software plus necessary universal hardware, and certainly, may also be implemented by means of hardware. However, the former is a better implementation manner in most cases. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for calling a terminal to join a conference, wherein the method comprises:
   obtaining site information of a site that is involved in the conference, wherein the site information comprises location information of the site and at least one of accommodating state information of the site and conference signal strength information sent by the site, and wherein the site corresponds to a called terminal;
   receiving a first call request information, wherein the first call request information carries identification information of the called terminal; and
   calling the called terminal according to the identification information of the called terminal, wherein the called terminal receives a first message that is published by another terminal in the conference, and wherein the called terminal publishes a second message to another terminal in the conference.

2. The method for calling the terminal to join the conference according to claim 1, wherein calling the called terminal according to the identification information of the called terminal comprises:
   sending call instruction information to the site corresponding to the called terminal when there is the site corresponding to the called terminal, wherein the call instruction information is used to instruct the site to send second call request information to the called terminal, and wherein the second call request information carries the identification information of the called terminal; and
   sending third call request information to the called terminal according to the identification information of the called terminal when there is no site corresponding to the called terminal.

3. The method for calling the terminal to join the conference according to claim 2, wherein before calling the called terminal according to the identification information of the called terminal, the method further comprises storing information about a correspondence between the called terminal and the site, and wherein the site is determined according to the identification information of the called terminal and the stored information about the correspondence between the called terminal and the site.

4. The method for calling the terminal to join the conference according to claim 3, wherein the site information is selected by the called terminal using a call control application.

5. The method for calling the terminal to join the conference according to claim 1, wherein calling the called terminal according to the identification information of the called terminal comprises:
   obtaining site information of all sites that are involved in the current conference, wherein the site information of all of the sites that are involved in the current conference comprises accommodating state information of the sites, location information of the sites, and conference signal strength information sent by the sites;

generating called terminal site recommendation information according to the accommodating state information, wherein the called terminal site recommendation information comprises recommended site information of one the sites that are involved in the current conference, wherein the one of the sites is at least one of in an unsaturated accommodating state, within a preset distance from the called terminal, and having a signal strength higher than a threshold;

sending the called terminal site recommendation information to the called terminal when the called terminal site recommendation information comprises the recommended site information of one the sites that are involved in the current conference, wherein the called terminal selects, according to the called terminal site recommendation information, one piece of site information corresponding to the called terminal from the site information in the called terminal site recommendation information;

receiving site selection information sent by the called terminal, wherein the site selection information comprises the one piece of site information corresponding to the called terminal; and sending call instruction information to the site corresponding to the site information in the site selection information such that the site calls the called terminal to join the current conference.

6. The method for calling the terminal to join the conference according to claim 5, wherein obtaining site information of all of the sites that are involved in the current conference comprises, obtaining, using a radio frequency identification technology, the site information of all of the sites that are involved in the current conference.

7. The method for calling the terminal to join the conference according to claim 1, wherein the first call request information is sent by the calling terminal or the called terminal using at least one of a remote user interface technology and a call control application.

8. A non-transitory computer readable medium comprising:
   computer-executable instructions for calling a terminal to join a conference, wherein the computer-executable instructions, when executed by a processor of an apparatus, cause the apparatus to perform operations comprising:
      obtaining site information of a site that is involved in the conference, wherein the site information comprises location information of the site and at least one of accommodating state information of the site and conference signal strength information sent by the site, and wherein the site corresponds to a called terminal;
      receiving a first call request information, wherein the first call request information carries identification information of the called terminal; and
      calling the called terminal according to the identification information of the called terminal, wherein the called terminal receives a first message that is published by another terminal in the conference, and wherein the called terminal publishes a second message to another terminal in the conference.

9. The non-transitory computer readable medium according to claim 8, wherein the operation of calling the called terminal according to the identification information of the called terminal comprises:
   sending call instruction information to the site corresponding to the called terminal when there is the site corresponding to the called terminal, wherein the call instruction information is used to instruct the site to send second call request information to the called terminal, and wherein the second call request information carries the identification information of the called terminal; and
   sending third call request information to the called terminal according to the identification information of the called terminal when there is no site corresponding to the called terminal.

10. The non-transitory computer readable medium according to claim 9, wherein the computer-executable instructions, when executed by the processor of the apparatus, further cause the apparatus to perform operations comprising storing information about a correspondence between the called terminal and the site and wherein the site is determined according to the identification information of the called terminal and the stored information about the correspondence between the called terminal and the site.

11. The non-transitory computer readable medium according to claim 10, wherein the site information is selected by the called terminal using a call control application.

12. The non-transitory computer readable medium according to claim 8, wherein the operation of calling the called terminal according to the identification information of the called terminal comprises:
   obtaining site information of all sites that are involved in the current conference, wherein the site information of all of the sites that are involved in the current conference comprises accommodating state information of the sites, location information of the sites, and conference signal strength information sent by the sites;
   generating called terminal site recommendation information according to the accommodating state information, wherein the called terminal site recommendation information comprises recommended site information of one the sites that are involved in the current conference, wherein the one of the sites is in an unsaturated accommodating state, within a preset distance from the called terminal, and having a signal strength higher than a threshold;
   sending the called terminal site recommendation information to the called terminal when the called terminal site recommendation information comprises the recommended site information of one the sites that are involved in the current conference, wherein the called terminal selects, according to the called terminal site recommendation information, one piece of site information corresponding to the called terminal from the site information in the called terminal site recommendation information;
   receiving site selection information sent by the called terminal, wherein the site selection information comprises the one piece of site information corresponding to the called terminal; and
   sending call instruction information to the site corresponding to the site information in the site selection information, wherein the site calls the called terminal to join the current conference.

13. The non-transitory computer readable medium according to claim 12,
   wherein the operation of obtaining site information of all of the sites that are involved in the current conference comprises, obtaining, using a radio frequency identification technology, the site information of all of the sites that are involved in the current conference.

14. The non-transitory computer readable medium according to claim 8, wherein the first call request information is sent by the calling terminal or the called terminal using at least one of a remote user interface technology and a call control application.

15. A computer program product comprising computer executable instructions which are stored on a non-transitory computer readable medium, wherein the executable instructions, when executed by a computer program processor, cause an apparatus for calling a terminal to join a conference to perform operations comprising:

obtaining site information of a site that is involved in the conference, wherein the site information comprises location information of the site and at least one of accommodating state information of the site and conference signal strength information sent by the site, and wherein the site corresponds to a called terminal;

receiving a first call request information, wherein the first call request information carries identification information of the called terminal; and calling the called terminal according to the identification information of the called terminal, wherein the called terminal receives a first message which is published by another terminal in the conference and that the called terminal publishes a second message to another terminal in the conference.

16. The computer program product according to claim 15, wherein the operation of calling the called terminal according to the identification information of the called terminal comprises:

sending call instruction information to the site corresponding to the called terminal when there is the site corresponding to the called terminal, wherein the call instruction information is used to instruct the site to send second call request information to the called terminal, and wherein the second call request information carries the identification information of the called terminal; and sending third call request information to the called terminal according to the identification information of the called terminal when there is no site corresponding to the called terminal.

17. The computer program product according to claim 16, wherein the computer executable instructions further cause the apparatus to perform operations comprising storing information about a correspondence between the called terminal and the site, and wherein the site is determined according to the identification information of the called terminal and the stored information about the correspondence between the called terminal and the site.

18. The computer program product according to claim 17, wherein the site information is selected by the called terminal using a call control application.

19. The computer program product according to claim 15, wherein the operation of calling the called terminal according to the identification information of the called terminal comprises:

obtaining site information of all sites that are involved in the current conference, wherein the site information of all of the sites that are involved in the current conference comprises accommodating state information of the sites, location information of the sites, and conference signal strength information sent by the sites;

generating called terminal site recommendation information according to the accommodating state information, wherein the called terminal site recommendation information comprises recommended site information of one the sites that are involved in the current conference, wherein the one of the sites is in an unsaturated accommodating state, within a preset distance from the called terminal, and having a signal strength higher than a threshold;

sending the called terminal site recommendation information to the called terminal when the called terminal site recommendation information comprises the recommended site information of one of the sites that are involved in the current conference, wherein the called terminal selects, according to the called terminal site recommendation information, one piece of site information corresponding to the called terminal from the site information in the called terminal site recommendation information;

receiving site selection information sent by the called terminal, wherein the site selection information comprises the one piece of site information corresponding to the called terminal; and sending call instruction information to the site corresponding to the site information in the site selection information, wherein the site calls the called terminal to join the current conference.

20. The computer program product according to claim 19, wherein the operation of obtaining site information of all of the sites that are involved in the current conference comprises, obtaining, using a radio frequency identification technology, the site information of all of the sites that are involved in the current conference.

\* \* \* \* \*